United States Patent [19]
Grunder

[11] Patent Number: 5,499,576
[45] Date of Patent: Mar. 19, 1996

[54] TABLETOP DEVICE FOR THE PREPARATION OF MEALS

[76] Inventor: Roger Grunder, Bleiki, CH-8143 Stallikon, Switzerland

[21] Appl. No.: 216,937

[22] Filed: Mar. 24, 1994

[30] Foreign Application Priority Data

Mar. 29, 1993 [CH] Switzerland ............................ 952/93

[51] Int. Cl.⁶ ............................ A47J 37/04; F24C 1/16
[52] U.S. Cl. ............................ 99/421 H; 99/447; 99/449; 126/9 R; 126/25 R
[58] Field of Search ........................ 99/449, 419, 421 R, 99/421 A, 421 H, 447, 450; 126/9 R, 25 R, 43, 44

[56] References Cited

U.S. PATENT DOCUMENTS

| | | | |
|---|---|---|---|
| 3,359,963 | 12/1967 | Kostial | 126/9 R |
| 4,140,099 | 2/1979 | Newport | 126/43 |
| 4,150,610 | 4/1979 | Ferrara. | |
| 4,688,542 | 8/1987 | Isbell | 126/9 R |
| 4,875,462 | 10/1989 | Armstrong et al. | 126/9 R |
| 4,896,650 | 1/1990 | Hait | 126/9 R |
| 4,905,659 | 3/1990 | Armistead | 126/9 R |
| 4,915,090 | 4/1990 | Hait | 126/9 R |
| 4,924,845 | 5/1990 | Johnson et al. | 126/9 R |
| 5,195,500 | 3/1993 | Lerner | 126/9 R |
| 5,197,454 | 3/1993 | Lee | 126/9 R |

FOREIGN PATENT DOCUMENTS 2475 11/1916 United Kingdom.

*Primary Examiner*—David Scherbel
*Assistant Examiner*—Reginald L. Alexander
*Attorney, Agent, or Firm*—Spencer & Frank

[57] ABSTRACT

The tabletop device for the preparation of meals comprises a burner, which may preferably be placed on a plate of wood, stone or the like in a nonslipping manner, and a grilling material carrier removably disposed above the burner. The burner is surrounded, at a lateral distance from it, by a chimney-like hood at least partly spaced from the plate and rising above the burner, whose side walls in combination with the walls of the burner delimit air flow channels communicating with ambient air at the bottom end. As a result of these measures an air flow acting upwards from below will be generated when the burner flame is ignited, spreading the flame across the entire burner surface and enriching it with oxygen to a great extent.

5 Claims, 1 Drawing Sheet

TABLETOP DEVICE FOR THE PREPARATION OF MEALS

BACKGROUND OF THE INVENTION

The present invention relates to a tabletop device for the preparation of meals, comprising a burner, which may preferably be placed on a plate of wood, stone or the like in a nonslipping manner, and a grilling material carrier removably disposed above the burner.

The necessity of cooking, roasting, or grilling food at the table and individually has existed forever as can be seen from various devices such as fondue rechauds and electrical raclette devices.

However, it has not been possible so far to grill meat above an open rechaud flame since sufficient heat could not be achieved above the flame, unless the material to be grilled is placed directly within the range of the flame, where, however, it will burn immediately. Such a disadvantage is inherent in the solution proposed by the French-Patent 7618882 providing a spit arrangement above an open flame.

SUMMARY OF THE INVENTION

Accordingly, it is the object of the present invention to provide a tabletop device of the above type, especially for grilling of food above an open flame, ensuring a sufficient temperature in the range of the grilling material carrier and avoiding the risk of charring or burning.

According to the invention, this will initially be achieved in that the burner is surrounded, at a lateral distance from it, by a chimney-like hood at least partly spaced from the plate and rising above the burner, whose side walls in combination with the walls of the burner delimit air flow channels communicating with ambient air at the bottom end.

As a result of these measures an air flow acting upwards from below will be generated when the burner flame is ignited, spreading the flame across the entire burner surface and enriching it with oxygen to a great extent thus leading to a highly increased grilling temperature.

This effect may be enhanced if the chimney-like hood is tapering in an upwards direction.

In a preferred embodiment of the tabletop grill according to the invention it is also convenient if the burner is an elongate container open at its top to receive a fire-starter paste or the like, or an elongate rechaud burner for methylated spirit or the like.

Furthermore, a preferred embodiment of the tabletop grill according to the invention may provide a grilling material carrier that is a grilling grid or revolving spit supported above the chimney-like hood.

BRIEF DESCRIPTION OF THE DRAWING

An exemplary embodiment of the subject-matter of the invention will be set forth hereinafter with reference made to the drawing, wherein.

DETAILED DESCRIPTION OF THE PREFERRED EMBODIMENT

Figure 1:
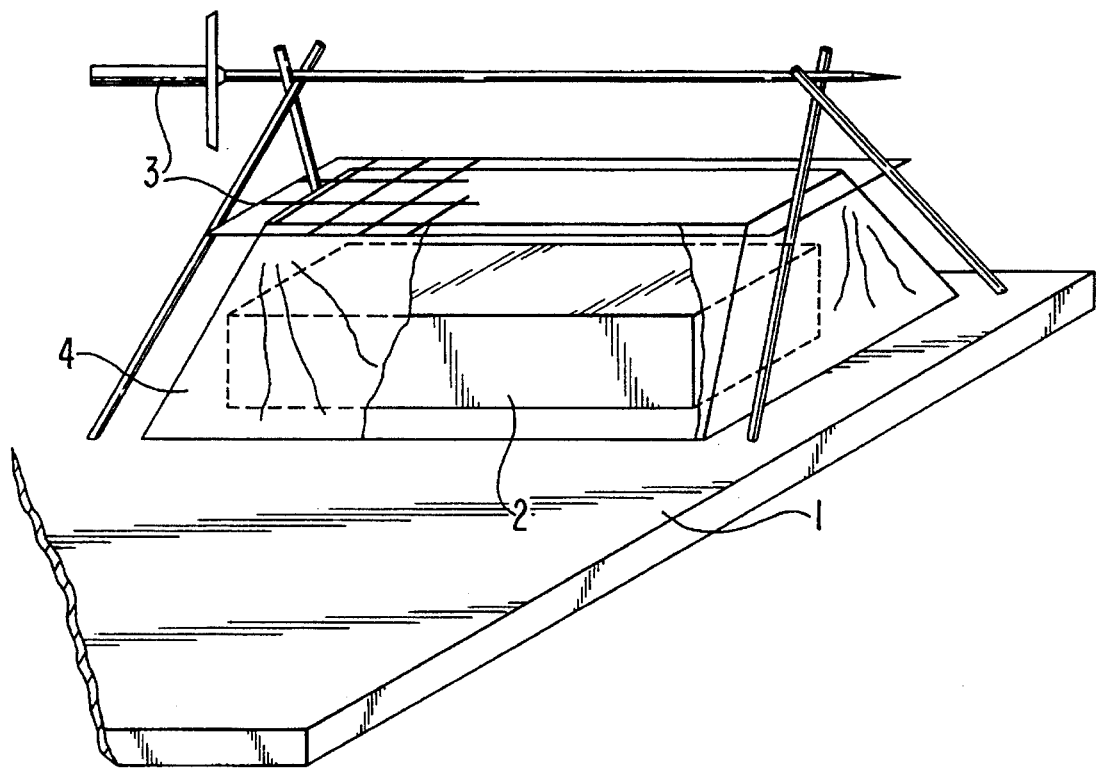
FIG. 1 is a diagrammatic view of a tabletop grill according to the invention.

The illustrated tabletop device according to the invention for the preparation of meals comprises a burner 2 which may preferably be placed on a plate 1 of wood, stone or the like in a non-slipping manner and a grilling material carrier 3 removably disposed above the burner.

According to the invention, the burner 2 is surrounded, at a lateral distance from it, by a chimney-like hood 4 at least partly spaced from the plate 1 and rising above the burner. The side walls of the hood 4 in combination with the walls of the burner 2 delimit air flow channels 5 communicating with ambient air at the bottom end of the channels.

Figure 2:
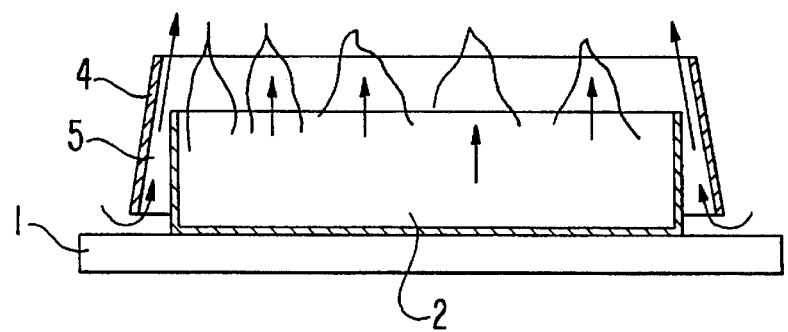
FIG. 2 is a sectional side elavational view of the tabletop grill of FIG. 1 to illustrate the burning effect under the generated air flow.

As a result of these measures an air flow acting upwards from below will be generated (FIG. 2) when the burner flame is ignited, spreading the flame across the entire burner surface and enriching it with oxygen to a great extent thus leading to a highly increased grilling temperature that will not immediately burn or char the material to be grilled.

This effect will be enhanced by tapering the chimney-like hood toward the top.

In a preferred embodiment of the tabletop grill according to the invention the burner 2 can be an elongate container open at its top to receive a fire-starter paste or the like, or an elongate rechaud burner for methylated spirit or the like.

Furthermore, the grilling material carrier 3 can be a grilling grid or revolving spit supported above the chimney-like hood 4.

The above renders it possible, for the first time, to prepare food properly above an open flame by using a tabletop device, especially to grill meat on a grilling grid or a revolving spit.

While there are shown and described preferred embodiments of the invention, it is to be distinctly understood that the invention is not limited thereto but may be embodied and practised within the scope of the following claims.

What I claim is:

1. A tabletop device for the preparation of meals, comprising:
   a plate;
   a burner having side walls and being positioned on the plate, the burner receiving fuel to be burned;
   a removable grilling carrier supported above the burner, and comprising one of a grilling grid and a revolving spit; and
   a chimney hood having side walls surrounding the burner, the chimney hood side walls being laterally separated from the burner side walls by a distance so as to define an air flow channel; at least a portion of the chimney hood side walls extending towards the plate and being separated from the plate by a distance to form an opening so that ambient air can communicate with the air flow channel; said one of a grilling grid and a revolving spit being supported over said chimney hood.

2. The tabletop device defined in claim 1, wherein the chimney hood tapers in a direction away from the plate.

3. The tabletop device defined in claim 1, wherein the burner comprises a container having a length greater than its width and being open on a side opposite from the plate, the container receiving a fire-starter substance.

4. The tabletop device defined in claim 1, wherein the burner comprises a rechaud burner having a length greater than its width for receiving a methylated spirit.

5. The table top device defined in claim 1, wherein the opening is located above the plate.

* * * * *